United States Patent
Jacobsson et al.

(10) Patent No.: US 7,334,562 B2
(45) Date of Patent: Feb. 26, 2008

(54) HOMOGENOUS CHARGE COMPRESSION IGNITION ENGINE CONTROL

(75) Inventors: Lisa Marie Jacobsson, Mölndal (SE); Oivind Andersson, Lund (SE)

(73) Assignee: Ford Global Technologies LLC, Dearborn, MI (US)

( * ) Notice: Subject to any disclaimer, the term of this patent is extended or adjusted under 35 U.S.C. 154(b) by 94 days.

(21) Appl. No.: 11/257,596

(22) Filed: Oct. 24, 2005

(65) Prior Publication Data
US 2007/0089704 A1 Apr. 26, 2007

(51) Int. Cl.
*F02B 3/10* (2006.01)
(52) U.S. Cl. .................... 123/299; 701/105
(58) Field of Classification Search ............. 123/299; 701/105
See application file for complete search history.

(56) References Cited

U.S. PATENT DOCUMENTS

| | | | |
|---|---|---|---|
| 4,543,930 A * | 10/1985 | Baker | 123/299 |
| 6,082,325 A * | 7/2000 | Digeser et al. | 123/299 |
| 6,276,334 B1 | 8/2001 | Flynn et al. | |
| 6,725,829 B2 * | 4/2004 | Kataoka et al. | 123/299 |
| 6,863,058 B2 | 3/2005 | Kurtz et al. | |
| 2004/0154582 A1 * | 8/2004 | Shimazaki | 123/299 |

\* cited by examiner

*Primary Examiner*—Erick Solis
(74) *Attorney, Agent, or Firm*—Allan J. Lippa; Alleman Hall McCoy Russell & Tuttle LLP

(57) ABSTRACT

A method is shown for operating an internal combustion engine having a combustion chamber with a piston, the internal combustion engine capable of injecting fuel into the combustion chamber multiple times during a cycle, the method comprising: performing a first fuel injection after approximately −25 crank angle degrees after top dead center and before approximately 15 crank angle degrees after top dead center; and performing a second fuel injection at least 5 degrees after the start of the first fuel injection and less than approximately 25 crank angle degrees after the start of the first fuel injection.

24 Claims, 4 Drawing Sheets

HOMOGENOUS CHARGE COMPRESSION IGNITION ENGINE CONTROL

FIELD

The present application relates to controlling engine operating with compression ignition combustion.

BACKGROUND AND SUMMARY

Various types of combustion may be used in an internal combustion engine. For example, a diesel cycle may be used where diesel fuel is injected into the combustion chamber and combustion occurs upon injection. Another type of combustion may be referred to as homogeneous charge compression ignition (HCCI) where fuel is injected into the combustion chamber and mixes with air near the autoignition temperature of the fuel to form a substantially homogeneous air-fuel mixture. Combustion of the air-fuel mixture occurs during compression when the temperature of the combustion chamber exceeds the autoignition temperature of the air and fuel mixture. HCCI operation can be used to provide greater fuel efficiency and reduced NOx production under some conditions. Yet another type of combustion may be referred to as partially homogeneous charge compression ignition (pHCCI), which is similar to HCCI except the injected fuel is only partially mixed with the air, thus creating a partially homogeneous air-fuel mixture.

One approach to controlling combustion is U.S. Pat. No. 6,276,334. In one example, during an HCCI operation, a single injection of fuel is performed late in the cycle in order to delay autoignition so that substantial mixing of the air and fuel occurs. In another example, split injections are performed where the first injection occurs substantially early in the intake stroke so that noise is reduced.

The inventors herein have recognized a disadvantage with such an approach. In some conditions, it may be desirable to delay autoignition as long as possible to provide sufficient time for mixing of air and fuel. However, when using a single injection to fuel the combustion chamber, a substantially large amount of fuel may be burned within a relatively short time period (such as with high engine loads), thus a high level of noise may be generated. Alternatively, if a split injection strategy is utilized where even a small early injection (pilot injection) is performed before a substantially larger main injection of fuel, the temperature within the combustion chamber may rise, thus advancing autoignition. As autoignition is advanced, the amount of time available for the air and fuel to mix is reduced and the amount of NOx and soot emissions may increase.

In one approach, the above issues may be addressed by a method of operating an internal combustion engine having a combustion chamber with a piston, the internal combustion engine capable of injecting fuel into the combustion chamber multiple times during a cycle, the method comprising: performing a first fuel injection after approximately −25 crank angle degrees after top dead center and before approximately 15 crank angle degrees after top dead center; and performing a second fuel injection at least 5 degrees after the start of the first fuel injection and less than approximately 25 crank angle degrees after the start of the first fuel injection.

In this way, combustion can be delayed by performing a first injection after approximately −20 degrees CA ATDC thus providing time for the air and fuel to mix. Further, by using a second injection performed approximately 10 degrees CA after the first injection, it is possible to reduce noise generated by the engine (by reducing rate of pressure rise, even though combustion is delayed), without prematurely raising combustion temperature. Therefore, it is possible to reduce engine noise concurrently while reducing emissions and improving fuel efficiency.

DETAILED DESCRIPTION OF THE DRAWINGS

DETAILED DESCRIPTION

Figure 1:
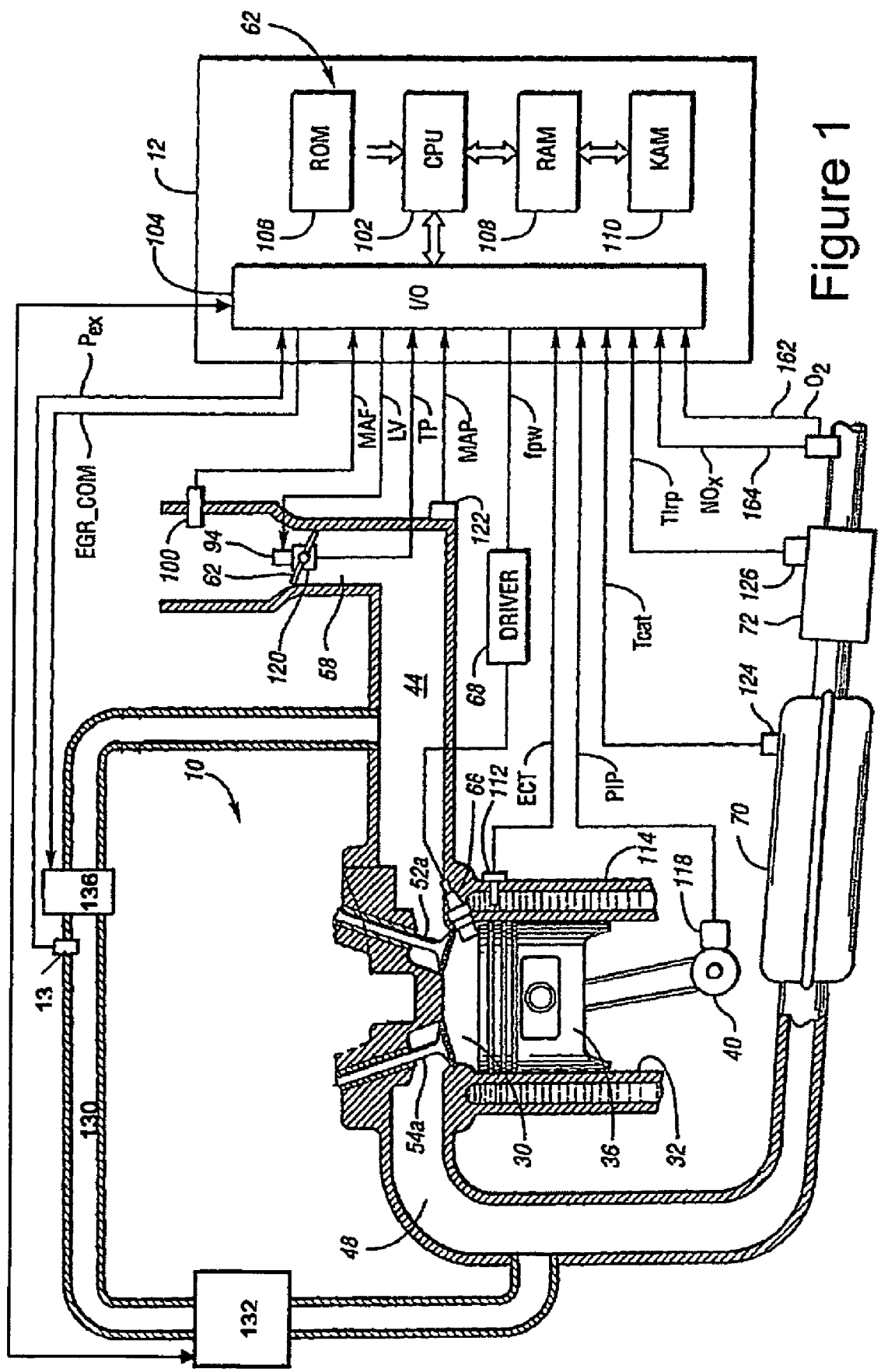
FIG. 1 is a schematic view of an internal combustion engine and control system.

Referring now to FIG. 1, direct injection internal combustion engine 10, comprising a plurality of combustion chambers and controlled by electronic engine controller 12 is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves. FIG. 1 is just one example of an internal combustion engine.

Further, exhaust gas recirculation (EGR) manifold 130 is shown communicating with exhaust manifold 48 and intake manifold 44. EGR cooler 132 is shown communicating with controller 12 for cooling the EGR prior to reaching the intake manifold 44. Also shown are EGR control valve 136 for controlling the flow of EGR and pressure sensor 134 for monitoring the pressure of the exhaust within the EGR manifold 130.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. Exhaust gas oxygen sensor 76 is shown coupled to exhaust manifold 48 upstream of catalytic converter 70. In an alternative embodiment, sensor 76 can provide a signal which indicates whether exhaust air-fuel ratio is either lean of stoichiometry or rich of stoichiometry. A mechanical supercharger (not shown) or mechanical turbocharger (not shown) may be coupled to engine 10, in one example.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

As will be described in more detail below, combustion in engine 10 can be of various types, depending on operating conditions. In some embodiments, engine 10 can operate in a diesel mode where fuel is combusted upon injection into the combustion chamber. In some embodiments, engine 10 can operate in a homogeneous charge compression ignition (HCCI) mode or a partially homogeneous charge compression ignition (pHCCI) mode.

Under some conditions, such as during HCCI or pHCCI operations, it may be desirable to delay autoignition so that the air and fuel within the combustion chamber have adequate time to mix, thus forming an air-fuel mixture of a desired homogeneity. Further, under some conditions, a single injection of fuel may be sufficient for fueling the combustion chamber. However, when operating the engine with a single injection operation, a substantially large amount of fuel may be burned within a relatively short time period (such as with higher engine loads), thus a higher level of noise may be generated. On the other hand, if a split injection strategy is utilized where a small early injection (pilot injection) is performed before a substantially larger main injection of fuel, the temperature within the combustion chamber may rise, thus advancing autoignition. The advanced autoignition may reduce the amount of time available for the air and fuel to mix and the amount of NOx and soot emissions may increase. Thus, under some conditions, it may be desirable to use a strategy that decreases the length of time the fuel is burned, while delaying autoignition so that sufficient mixing of the air and fuel occurs.

One approach to providing such operation is to operate engine 10 so that the direct fuel injector performs a first injection after −25 crank angle (CA) degrees after top dead center (ATDC), but before 15 degrees CA ATDC and performs a subsequent second injection approximately 5-25 CA degrees thereafter. In some embodiments, under some conditions, improved engine performance can be achieved by performing a first injection between −20 degrees CA and 10 degrees CA ATDC followed by a second fuel injection performed approximately 5 to 20 degrees after the first injection. In some embodiments, under some conditions, a further improvement of engine performance can be achieved by a first injection performed between −15 and 7 degrees CA ATDC followed by a second fuel injection performed approximately 11 degrees CA after the first injection. In this manner, the second injection of fuel does not substantially affect autoignition timing and a shorter burn duration may be achieved (as the late cycle oxidation is enhanced by the increased turbulence) which serves to reduce NOx and soot emissions. Also, a decrease in noise is achieved due to a slower pressure rise during combustion achieved by the smaller amount of fuel burning in the early stages of combustion. Further, an effect of the second injection on noise is reduced since the second injection burns after the peak heat release.

In some embodiments, the first injection may supply a substantially large majority of the fuel that is to be injected and may therefore be referred to as the main injection. Next, a second substantially smaller injection may be performed and therefore referred to as the post injection. As described in more detail below, the second injection may be less than 50% of the first injection, or various other percentages.

Figure 2:
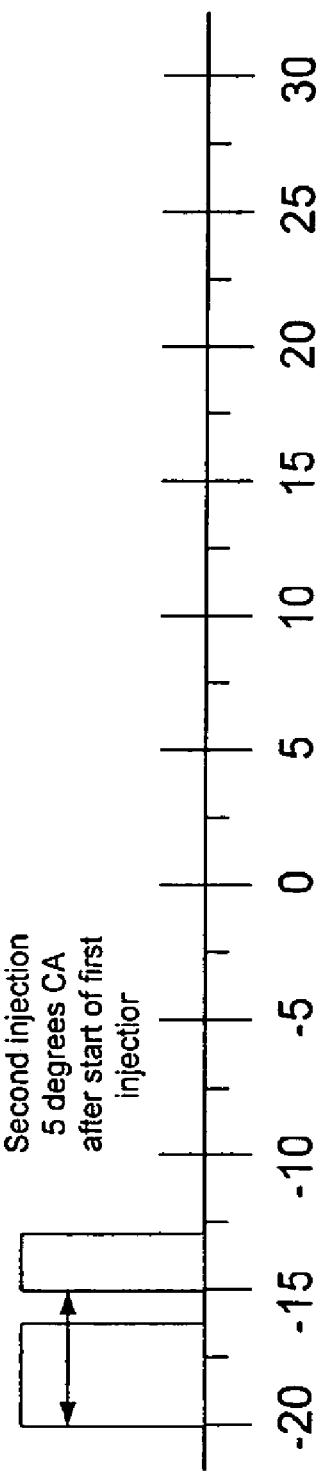
FIGS. 2-4 are example timing diagrams showing the approximate timing of a first and a second fuel injection.
Figure 3:
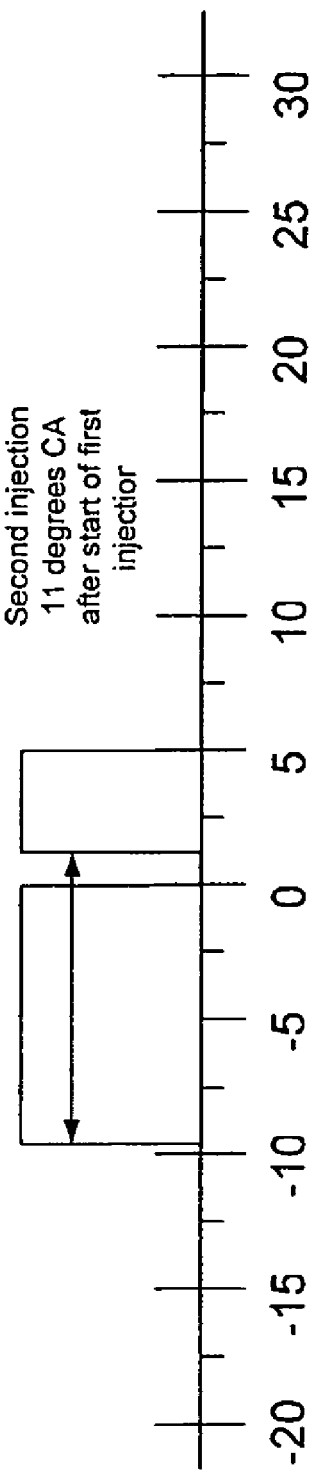
Figure 4:
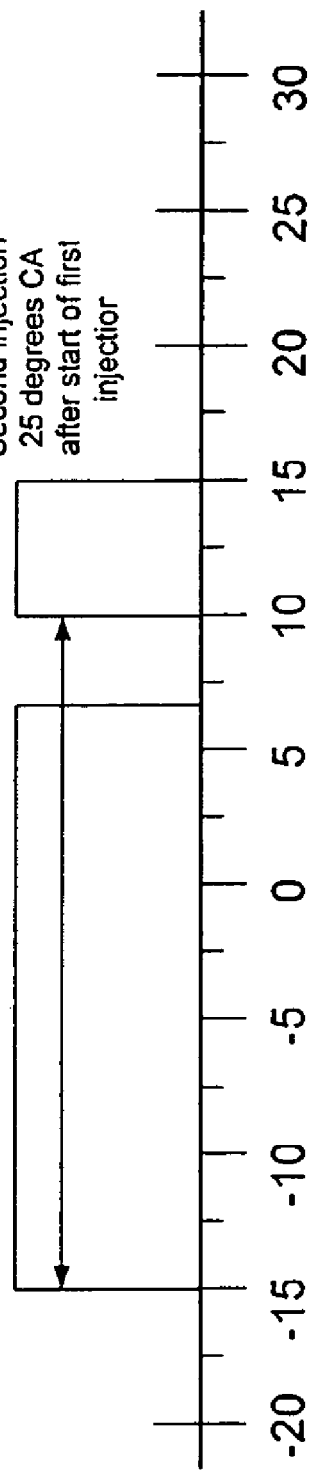

Referring now to FIGS. 2-4, example injection timing diagrams for performing a first and second fuel injection are shown. Specifically, FIG. 2 shows an example of a first injection followed by a second smaller fuel injection. For example, FIG. 2 shows the first fuel injection initiated at approximately −20 degrees CA ATDC and performed for approximately 3 degrees CA, however other durations of the fuel injection are possible depending on the desired amount of fuel to be injected, size of injectors, injection pressure, etc. Next, 5 degrees CA commence between the initiation of the first fuel injection and the initiation of the second fuel injection. The second fuel injection is initiated at approximately −15 degrees CA ATDC and is performed for approximately 2 degrees CA. The timing of autoignition may be controlled by adjusting a variety of engine operating conditions such as: EGR, turbocharging, supercharging and valve timing among others. In some embodiments, autoignition of the fuel may occur after the first injection, but before the second injection, however autoignition may occur at other timings as well.

Referring now to FIG. 3, an example first and a substantially smaller second injection is shown with the first injection initiated later in the cycle than the first injection shown in FIG. 2. For example, the first injection is initiated at approximately −9 degrees CA ATDC and is performed for approximately 9 degrees CA. Approximately 11 degrees CA after the start of the first injection, a second injection is initiated at 2 degrees CA and is performed for approximately 3 degrees CA.

Referring now to FIG. 4, an example of a substantially larger first injection and a smaller second injection is shown. For example, the first injection is initiated at approximately −15 degrees CA ATDC and is performed for approximately 22 degrees CA. Approximately 25 degrees CA after the start of the first injection, a second injection is initiated at 10 degrees CA and is performed for approximately 5 degrees CA.

In this manner, a first injection may be performed where the fuel mixes with the air in the combustion chamber. A subsequent second injection is performed in order continue fueling of the combustion chamber. The amount and timing of the first and second fuel injections are described in more detail below with reference to FIG. 5. In some embodiments, the amount and/or timing of the first fuel injection may be varied as engine load varies. In some embodiments, the amount and/or timing of the second fuel injection may be varied as engine load varies. However, other factors may affect the amount and/or duration of the first and second fuel injections. For example, the amount and/or timing of one injection may affect the amount and/or timing of the other injection. In another example, engine operating conditions may also affect the amount and/or timing of the first and second injection.

Figure 5:
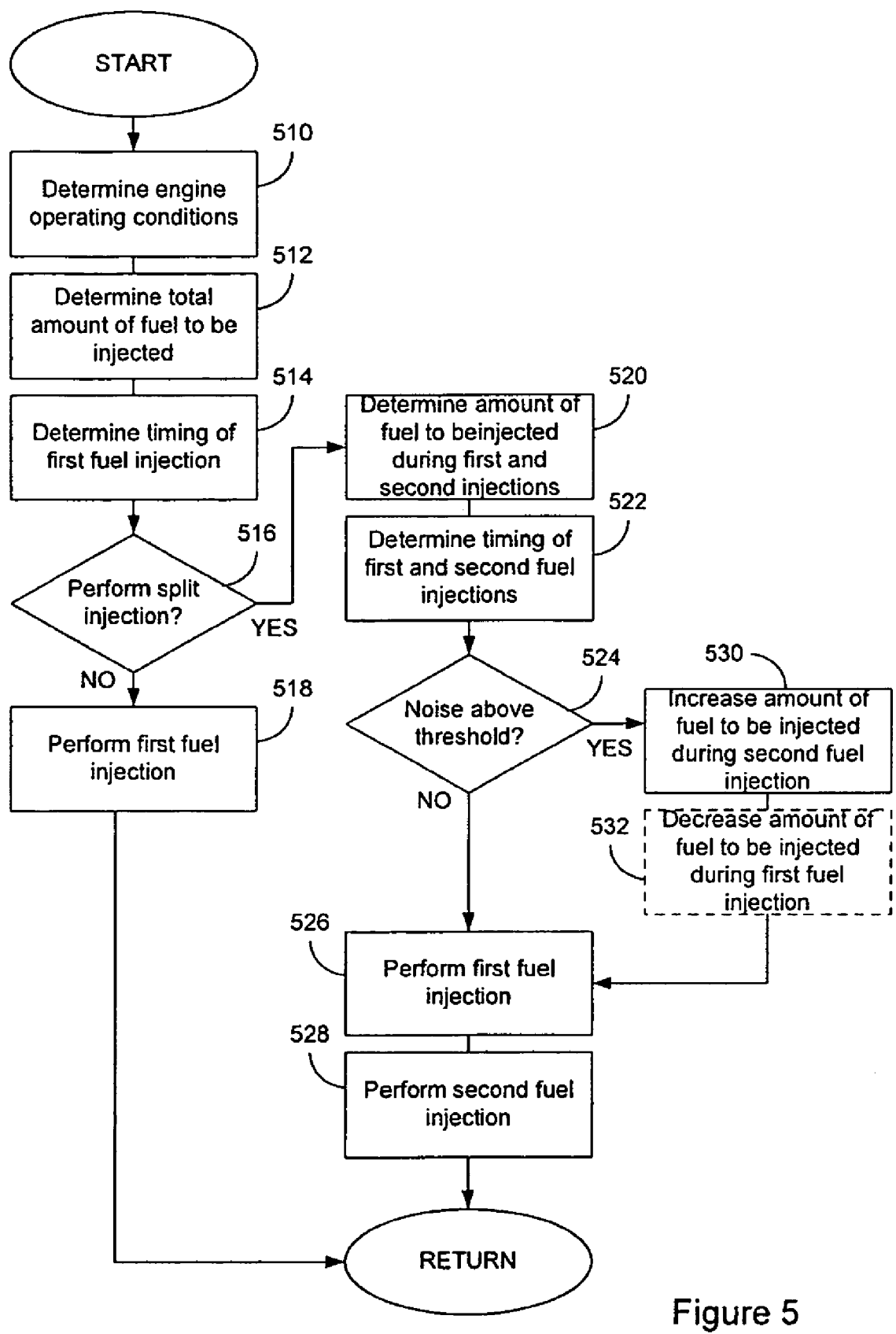
FIG. 5 is a flow chart for an example engine control routine.

Referring now to FIG. 5, a routine for controlling the fueling of the combustion chamber is shown. Beginning with step 510, engine operating conditions are determined. Engine operating conditions may include: engine noise, load, rpm, accelerator pedal position, an amount of turbocharging or supercharging, manifold pressure, vehicle speed, air-fuel ratio, and EGR among various others or combinations thereof. Next, the routine proceeds to step 512 where a total amount of fuel to be injected during the cycle is determined. In some embodiments, the total amount of fuel may be based on the engine operating conditions or a desired engine torque determined in step 510 or may be based on predicted future operating conditions as well as the current operating conditions.

Next, the routine proceeds to step 514 where the timing of the first fuel injection is determined. In some embodiments, the timing of the first fuel injection may be based on the engine operating conditions determined in step 510. For example, timing may be advanced or retarded as engine speed increases, engine load increases, etc. Next, the routine proceeds to step 516 where it is judged whether to perform a split injection. In some embodiments, the answer at step 516 may be determined based on the determination of steps 510 and 512 among others. For example, the determination of whether to use split injection may be based on noise level, engine temperature, number of combustion events, and/or engine load among others. If the answer at step 516 is no, the routine proceeds to step 518 where only a first fuel injection is performed of the amount and timing as determined in steps 512 and 514 respectively. Next, the routine returns to step 510 for the next engine cycle.

Alternatively, if the answer at step 516 is yes, the routine proceeds to step 520 where the amount of fuel to be injected by a first and a subsequent second injection are determined. In some embodiments, the injection amounts determined in step 520 may be based on the determination of step 510, 512 and 514 among others. In some embodiments, the amount of each injection and the timing of each injection may be adjusted based on engine operating conditions as determined in step 510.

In some embodiments, the amount of fuel injected by the first injection and the second injection may be adjusted concurrently with the timing of the first and the second injections. Further, the amount of fuel determined in steps 520, 530 and 532 may be adjusted as a relative amount (i.e. ratio) of the first and second injection and/or as an absolute amount for each injection. For example, in some conditions, as the relative amount of fuel injected by the first injection is increased, the timing of the first and/or second injection may be adjusted (i.e. advanced and/or retarded). In another example, as the absolute amount of the first injection is decreased, the time period between the first and the second injections may be adjusted (i.e. increased or decreased). Thus, the amount (relative and/or absolute) of fuel injected by the first and the second injections may alter the timing of the injections and visa-versa.

In other words, the absolute amount of fuel for each injection, the relative amount of fuel between each injection, the start time of each injection, the time between injections and the engine operating conditions may be interrelated thus a change of one parameter may affect the other parameters.

In some embodiments, the total amount of fuel delivered by the two injections may be set to a constant value where if the amount of fuel delivered by one of the injections is to be increased, then the amount of fuel delivered by the other injection is decreased by the same amount. In another example, the amount of fuel delivered by one of the injections may remain constant while the amount of fuel delivered by the other injection is adjusted to provide a variable total fuel amount. In yet another example, the amount of fuel delivered by the first injection may be adjusted independently of the second fuel injection. The first fuel injection may be reduced by a first amount, while the second fuel injection is increased by an amount different from the first amount. In one example, as the second injection is increased, the first injection may be decreased by an amount greater than the increase in the second injection since the larger second injection may provide improved fuel consumption.

Next, the routine proceeds to step 522 where a timing of the first and the second fuel injection is determined. In some embodiments, the timing of the first and second injections may be based on the determination of step 510, 512, 514 and 520 among others. In some embodiments, the timing of the first injection may be adjusted from the timing initially determined in step 514. For example, if a second subsequent injection is to be performed, the timing of the first injection may be advanced and vice versa. In some embodiments, the timing of the second fuel injection may be set to a constant degree CA after the initiation of the first fuel injection. For example, the second fuel injection may be configured to occur at 10 degrees CA after the initiation of the first fuel injection, even as the timing of the first injection varies. Also, the timing of both injections may be retarded or advanced as engine load varies, engine speed varies, or combinations thereof.

In some embodiments, engine 10 may be further configured with a noise detection sensor for detecting noise generated by the engine. For example, as the noise generated by the engine surpasses a prescribed noise threshold, as detected by the noise detection sensor, the amount of fuel injected during the first and second fuel injections may be adjusted (e.g., decreasing an amount of a first injection and increasing an amount of a second injection, or combinations thereof). However, other methods of determining engine noise are possible, such as a pressure sensor, knock sensor, engine load and rpm among others. Next, the routine proceeds to step 524 where it is judged whether the noise generated by the engine is above a prescribed threshold. In some embodiments, the threshold may be based at least partially on engine operating load, rpm and vehicle speed among others. If the answer to step 524 is no, the routine proceeds to step 526. At step 526 a first fuel injection is performed for the amount determined in step 520 and the timing determined in step 522 for the first injection. Next, the routine proceeds to step 528 where a second fuel injection is performed for the amount determined in step 520 and at the timing as determined in step 522 for the second injection. Next, the routine returns to step 510 for the next engine cycle.

Alternatively, if the answer at step 524 is yes, the routine proceeds to step 520 where the amount of fuel injected during the second fuel injection is increased. Thus, under some conditions, an increase of the relative amount of fuel injected later in the cycle (i.e. by the second injection) can be used to decrease the burn duration. The amount of the decrease may be proportional to the amount that the noise is above the prescribed threshold. In some embodiments, the amount of the second fuel injection may be increased until a maximum is reached based on combustion stability, fuel efficiency or engine load among various others. As mentioned above with reference to step 520, the timing of the first and/or second injection may affect the amount of fuel (relative and/or absolute) delivered by each injection. Further, the amount of EGR used or the amount of EGR cooling may also be adjusted concurrently with the amount of the second fuel injection. For example, as the amount of the second fuel injection is increased, the amount of EGR cooling may be increased. Next, the routine proceeds to step 532 where in some embodiments the amount of fuel injected during the first fuel injection is decreased. However in some embodiments, step 532 may be bypassed.

In this manner, when the amount of fuel delivered by the first and second fuel injection are equivalent to the total fuel injection determined in step 512, the same or similar amount of fuel is being used for each cycle while at the same time reducing engine noise.

Next, the routine proceeds to step 526 where a first fuel injection is performed for the amount determined in step 520 or step 532 at the timing determined in step 522 for the first injection. Next, the routine proceeds to step 528 where a second fuel injection is performed for the amount determined in step 530 at the timing in step 522 for the second injection. Next, the routine returns to step 510 for the subsequent engine cycle.

In this way, it is possible to provide improved engine output and reduce emissions and noise across a wide range of operating conditions, and be able to adjust for variation of numerous parameters, by utilizing appropriate start of injection timing, timing between injections, amounts of fuel, and relative amounts of fuel of a first and second injection.

In some embodiments, the routine described above may include additional steps. For example, under some conditions it may be necessary to adjust the timing of the first and second injections if the detected noise is above the prescribed threshold. For example, under some conditions, the timing of the first injection may be advanced if the detected engine noise is increasing. In another example, the CA separation between the initiation of the first and second injections may be increased as engine noise increases. In some embodiments, step 524 may include a variety of other decisions that may include engine load, rpm or EGR conditions among others or combinations thereof. As noted above, the routine may be configured to adjust at least one of a timing of the first injection, a timing of the second injection, an amount of the first injection, and an amount of the second injection in response to at least one of a timing of the first injection, a timing of the second injection, an amount of the first injection, an amount of the second injection, engine load, engine speed, engine noise, engine temperature, and other engine operating conditions among others or combinations thereof.

In some embodiments, more than two fuel injections may be used to fuel the combustion chamber. For example, a substantially larger first injection may precede two smaller fuel injections. As described above with reference to FIG. 5, each fuel injection of a plurality of fuel injections may be adjusted independently in response to engine operating conditions, the amount of the other fuel injections, the timing of the other fuel injections, among others and combinations thereof.

Figure 6:
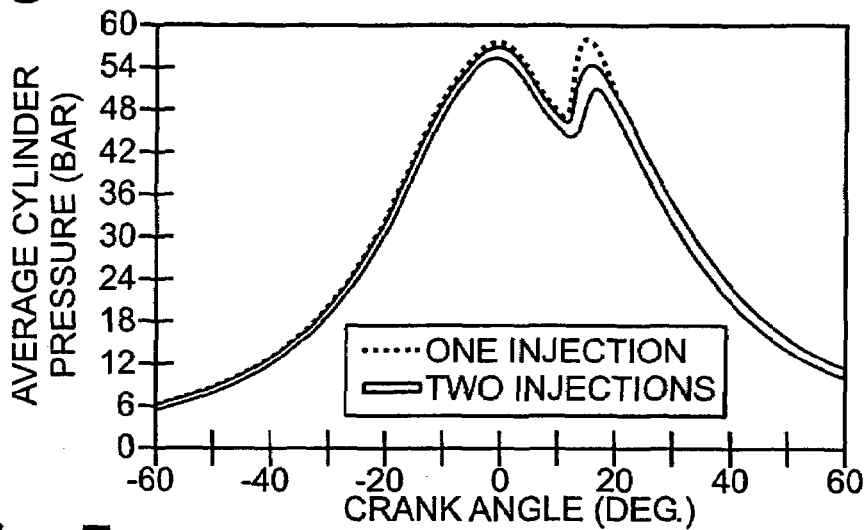
FIG. 6 is a graph comparing crank angle and cylinder pressure with a single injection and two injection strategy.
Figure 7:
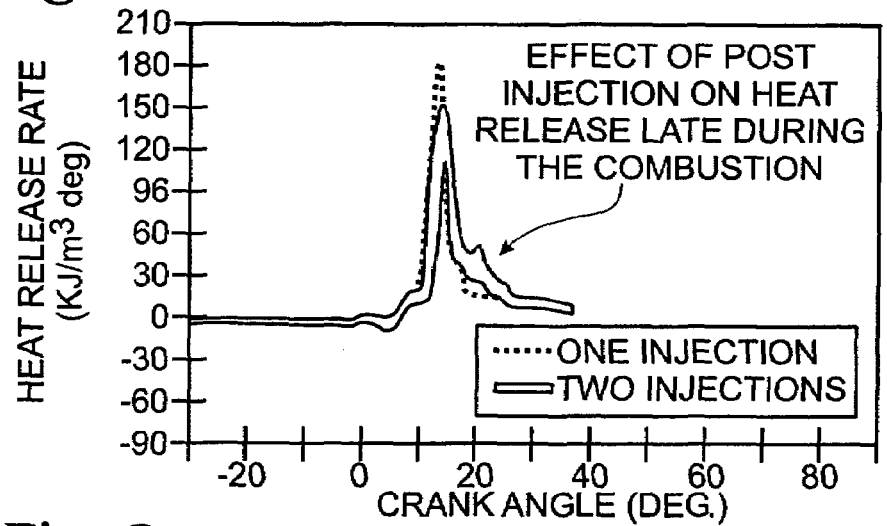
FIG. 7 is a graph comparing crank angle and heat release rate with a single injection and two injection strategy.
Figure 8:
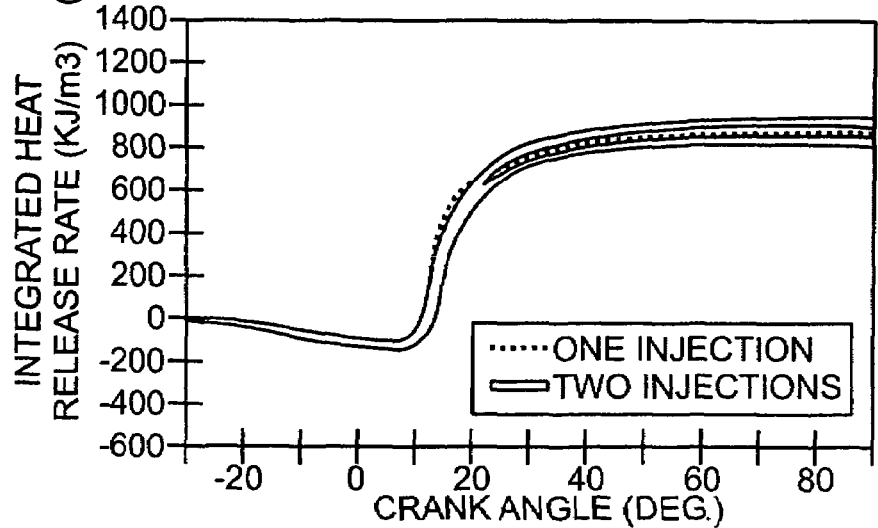
FIG. 8 is a graph comparing crank angle and integrated heat release with a single injection and two injection strategy.

Referring now to FIGS. 6-8, graphs comparing cylinder pressure, heat release rate and integrated heat release to crank angle at the same fuel consumption for a single injection (dotted lines) and two injections (solid lines) are shown. FIG. 6 shows how peak pressures are reduced for the same fuel consumption when using two fuel injections instead of a single injection, particularly in the 10-20 degree CA region. FIG. 7 shows how peak heat release rates are reduced for the same fuel consumption when using two fuel injection instead of a single injection, particularly in the 10-20 degree CA region. FIG. 7 also shows an increase in heat release rate during the second injection at approximately 20 degrees CA. Therefore, FIGS. 7 and 8 demonstrate how peak pressures may be reduced (FIG. 6) while decreasing the burn duration. FIG. 8 shows how the integrated heat release for both the single and two injection strategy are similar. Thus, these figures illustrate at least some benefit of the two injections according to the present application.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-5, I-6, V-12, opposed 4, and other engine types. Further, the adjustments to the relative amounts of fuel between a first and second injection may be adjusted based on engine maps as a function of engine parameters and may further include feedback adjustments based on sensor data. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an internal combustion engine having a combustion chamber with a piston, the internal combustion engine capable of injecting fuel into the combustion chamber multiple times during a cycle, the method comprising:
   performing a first fuel injection after approximately −25 crank angle degrees after top dead center and before approximately 15 crank angle degrees after top dead center;
   performing a second fuel injection at least 5 degrees after the start of the first fuel injection and less than approximately 25 crank angle degrees after the start of the first fuel injection;
   adjusting an amount of the second fuel injection relative to an amount of the first fuel injection as a level of noise generated by the engine varies;
   recirculating at least a portion of the exhaust gas produced by the engine, back into the combustion chamber via a recirculated exhaust gas cooler; and
   varying a level of cooling provided to the recirculated exhaust gas by the cooler responsive to the amount of the second fuel injection.

2. The method of claim 1 wherein the first fuel injection is substantially larger than the second fuel injection.

3. The method of claim 1 wherein the first fuel injection is performed after approximately −15 crank angle degrees after top dead center and before 7 crank angle degrees after top dead center and the second fuel injection is performed approximately 10 crank angle degrees after the start of the first fuel injection.

4. The method of claim 1 wherein the amount of the second fuel injection is increased when the level of noise generated by the internal combustion engine is above a prescribed noise threshold.

5. The method of claim 4 further comprising, reducing the amount of the first fuel injection by an amount substantially similar to an increase of the amount of the second fuel injection.

6. The method of claim 1 wherein a timing for performing the first fuel injection is varied as an operating condition is varied.

7. The method of claim 1 wherein a timing for performing the second fuel injection is varied as an operating condition is varied.

8. The method of claim 1 further comprising, varying a timing of the second fuel injection responsive to the amount of the first fuel injection.

9. The method of claim 1 wherein during a first operating condition the second fuel injection is performed and during a second operating condition the second fuel injection is not performed.

10. The method of claim 1 wherein the first fuel injection and the second fuel injection are combined in the combustion chamber with air to form an air and fuel mixture; where the air and fuel mixture attains a temperature where autoignition occurs and the mixture combusts after a substantial amount of mixing of the air and the fuel has occurred.

11. The method of claim 10 wherein the air and fuel mixture is substantially homogeneous prior to combustion.

12. A system, comprising:
   an engine having a combustion chamber;
   a piston disposed at least partially within the combustion chamber;
   a fuel injector configured to perform multiple injections of fuel during a cycle, the fuel injector configured to injected fuel directly into the combustion chamber; and
   a controller configured control the fuel injector to perform a first injection and a second injection, where the first injection is substantially larger than the second injection and at least the first injection 1s varied as an engine load varies and wherein the controller is configured to vary a timing of the second injection responsive to an amount of the first injection.

13. The system of claim 12 wherein the controller is further configured to vary the second injection the engine load varies.

14. The system of claim 12 wherein the controller is further configured to increase an absolute amount of fuel injected in the second injection as engine load increases.

15. The system of claim 12 wherein the controller is further configured to increase an amount of fuel injected by the second injection relative to the first injection.

16. The system of claim 12 wherein the first injection and the second injection are combined in the combustion chamber with air to form an air and fuel mixture; where the air and fuel mixture attains a temperature where autoignition occurs and the mixture combusts after a substantial amount of mixing of the air and the fuel has occurred.

17. The system of claim 12 wherein the controller is further configured to adjust at least one of a timing of the first injection, an amount of the first injection, a timing of the second injection, and an amount of the second injection based on an engine operating condition.

18. The system of claim 17 wherein the engine operating condition is at least one of an engine load, an engine rpm, a vehicle speed, an accelerator pedal position, a noise generated by the engine and an engine temperature.

19. The system of claim 18, wherein the first injection is performed before top dead center during a first engine load and the first injection is performed after top dead center during a second engine load higher than the first engine load.

20. The system of claim 12, wherein the first injection is initiated after approximately −25 crank angle degrees after top dead center and before approximately 15 crank angle degrees after top dead center; and the second injection is initiated at least 5 degrees after said initiation of the first injection and less than approximately 25 crank angle degrees after said initiation of the first injection.

21. The system of claim 12 further comprising, an exhaust recirculation system configured to recircuculate exhaust gases back into the engine, wherein the exhaust recirculation system includes a cooler configured to cool the recirculated exhaust gases, and wherein the controller is further configured to vary a level of cooling provided by the cooler responsive to an amount of the second injection.

22. A method of operating an internal combustion engine having a combustion chamber with a piston, a fuel injector, a controller for at least controlling the fuel injector, the fuel injector configured to inject fuel directly into the combustion chamber multiple times during a cycle, the method comprising:
   performing a first fuel injection after approximately −15 crank angle degrees after top dead center;
   performing a second fuel injection less than approximately 25 crank angle degrees after the first injection;
   adjusting a timing of at least the second fuel injection based on an amount of the first fuel injection; and
   adjusting a relative amount of fuel injected by the first fuel injection and the second fuel injection based on a level of noise produced by the engine.

23. The method of claim 22 wherein the first fuel injection is performed before approximately 10 crank angle degrees after top dead center and the second fuel injection is performed at least 5 crank angle degrees after the start of the first injection.

24. The method of claim 22 further comprising, recirculating exhaust gases produced by the engine into an intake passage of the engine and varying a level of cooling applied to the recirculated exhaust gases responsive to the amount of the second fuel injection.

* * * * *